United States Patent [19]
Scholder et al.

[11] Patent Number: 5,822,182
[45] Date of Patent: Oct. 13, 1998

[54] FLEXIBLE I/O PORT CONFIGURATION AND CONNECTOR LABELING SCHEME FOR COMPUTER CHASSIS

[75] Inventors: Erica Scholder; Timothy Radloff, both of Austin, Tex.

[73] Assignee: Dell U.S.A. L.P., Round Rock, Tex.

[21] Appl. No.: 788,670

[22] Filed: Jan. 24, 1997

[51] Int. Cl.$^6$ .............................. G06F 1/16; H05K 9/00; G09F 3/00
[52] U.S. Cl. ........................... 361/683; 361/818; 40/316; 40/663; 439/491
[58] Field of Search ............................ 40/316, 663, 668; 439/607, 609, 488–491, 955; 364/708.1; 361/683–686, 816, 818; 174/35 R; 211/119.003

[56] References Cited

U.S. PATENT DOCUMENTS

| | | | |
|---|---|---|---|
| 5,347,430 | 9/1994 | Curlee et al. | 361/816 |
| 5,406,453 | 4/1995 | Cusato et al. | 361/683 X |
| 5,497,292 | 3/1996 | Gandre | 361/818 |

*Primary Examiner*—Michael W. Phillips
*Attorney, Agent, or Firm*—Haynes and Boone, L.L.P.

[57] ABSTRACT

A flexible I/O port configuration and connector labeling scheme for a computer chassis. An I/O shield that includes connector cutouts specific to a system motherboard is attached to the system motherboard. The motherboard to which the I/O shield is attached may be installed in a generic chassis that includes cutouts for "standard" connectors, such as VGA, keyboard, audio and mouse connectors, as well as a flexible I/O cutout for receiving custom connectors, such as USB and network connectors. Any connector cutout or portion of a cutout provided in the chassis through which a connector does not extend is filled by the I/O shield. In another aspect, an I/O labeling strip on which are printed icons for identifying the various connectors is press-fit onto the chassis, such that the strip can be easily removed and replaced. Each strip is provided with an alignment code that corresponds to an alignment code stamped on the I/O shield and visible through an unused or partially used cutout of the chassis such that, when the strip is properly positioned relative to the chassis, the codes are also aligned with one another.

12 Claims, 7 Drawing Sheets

FLEXIBLE I/O PORT CONFIGURATION AND CONNECTOR LABELING SCHEME FOR COMPUTER CHASSIS

TECHNICAL FIELD

In one embodiment, the invention relates generally to computer chassis and, more particularly, to a flexible I/O port configuration and connector labeling scheme for a computer chassis.

BACKGROUND

Even using the most advanced CAD tools and production techniques, the process of designing, tooling and producing a computer chassis is one that takes several months to complete. In order to compete in today's market and introduce new products to the market as quickly as possible, it is necessary to design chassis that are capable of housing many different computer configurations without requiring expensive and time-consuming tooling changes to the chassis for each different configuration.

One of the greatest challenges in achieving this goal is that different system motherboards have different connectors that need to be accessed from outside the chassis. For example, one motherboard might have universal serial bus ("USB") and speaker connectors, while another might have a network connection and an extra serial port. Providing the appropriate connector cutouts in the chassis for each different motherboard quickly becomes unmanageable, as a tooling change is required for every motherboard that is used and a product-specific back panel or chassis base is required for every different product. Handling multiple chassis is expensive, as it requires the storage and management of many different part numbers. In addition, the flexibility of a manufacturing line is compromised, especially in build-to-order models where many different products are built on one line.

Historically, there have been numerous attempts to accommodate different I/O connector configurations with a single or a few different chassis. For example, a different chassis base can be created that has cutouts specific to each system board. This is expensive, in terms of tooling, administrative, and storage costs. It also creates manufacturing difficulties, as having a chassis for each board would mean having to store a variety of different bases on-line for assemblers to pull from.

Another way to solve the problem is to change the cutouts in the chassis base each time a new product is introduced; however, this solution only works if a manufacture does a hard switch-over from one product to another, because once the manufacturer completes the switch-over, it could not switch back without retooling the chassis base. This solution is also deficient in that it would require the manufacturer to store and manage many different revisions of parts for repairs and service stock.

Another area of concern in connection with computer chassis is the need to label the different connectors accessible through the rear wall of the chassis. Such labeling has in the past been accomplished by simply stamping icons identifying the connectors directly onto the rear wall of the chassis itself. This method has become less popular, however, as ever-stricter environmental requirements, especially in Europe, render it inadvisable to stamp icons directly onto the chassis, as the ink contaminates the part of the chassis to which it is applied, making it more difficult to recycle.

Another solution has been to stamp the icons onto a labeling strip, which is then affixed to the computer chassis with an adhesive. This solution is also deficient in certain respects. In particular, it is often difficult to properly align a strip as it is being applied to the chassis. Moreover, although it is possible, albeit fairly difficult, to remove and realign the strip, removal of the strip leaves a messy adhesive residue that must be cleaned before the same or another strip can be applied.

Accordingly, what is needed is a flexible I/O port configuration for computer chassis which has a labeling mechanism that is environmentally acceptable and easy to align properly.

SUMMARY

One embodiment includes an I/O shield that is attached to a system motherboard. The I/O shield includes connector cutouts specific to the system motherboard. In this manner, the motherboard to which the I/O shield is attached may be installed in a generic chassis that includes cutouts for "standard" connectors, such as VGA, keyboard, audio and mouse connectors, as well as a flexible I/O cutout for receiving custom connectors, such as USB and network connectors. Any connector cutout or portion of a cutout provided in the chassis through which a connector does not extend is filled by the I/O shield.

In another aspect of the above-described embodiment, an I/O labeling strip on which are printed icons for identifying the various connectors is press-fit onto the chassis, rather than being affixed thereto with adhesive, such that the strip can be easily removed and replaced. Moreover, each strip is provided with an alignment code that corresponds to an alignment code stamped on the I/O shield and visible through an unused or partially used cutout of the chassis such that, when the proper strip is applied to the chassis, the codes are also aligned with one another.

A technical advantage achieved is that a single chassis design can be used to house several different computer systems, thereby reducing the number of parts that must be kept in inventory.

Another technical advantage achieved is that the I/O shield can be connected to the motherboard by the motherboard manufacturer, thereby reducing the amount of labor that must be expended by the computer manufacturer.

A further technical advantage achieved is that I/O labeling strips can be easily removed and replaced when necessary.

Yet another technical advantage achieved with the invention is that use of the I/O labeling strip prevents any part of the chassis from being contaminated by the ink used to label the connectors.

DESCRIPTION OF THE PREFERRED EMBODIMENT

Figure 1:
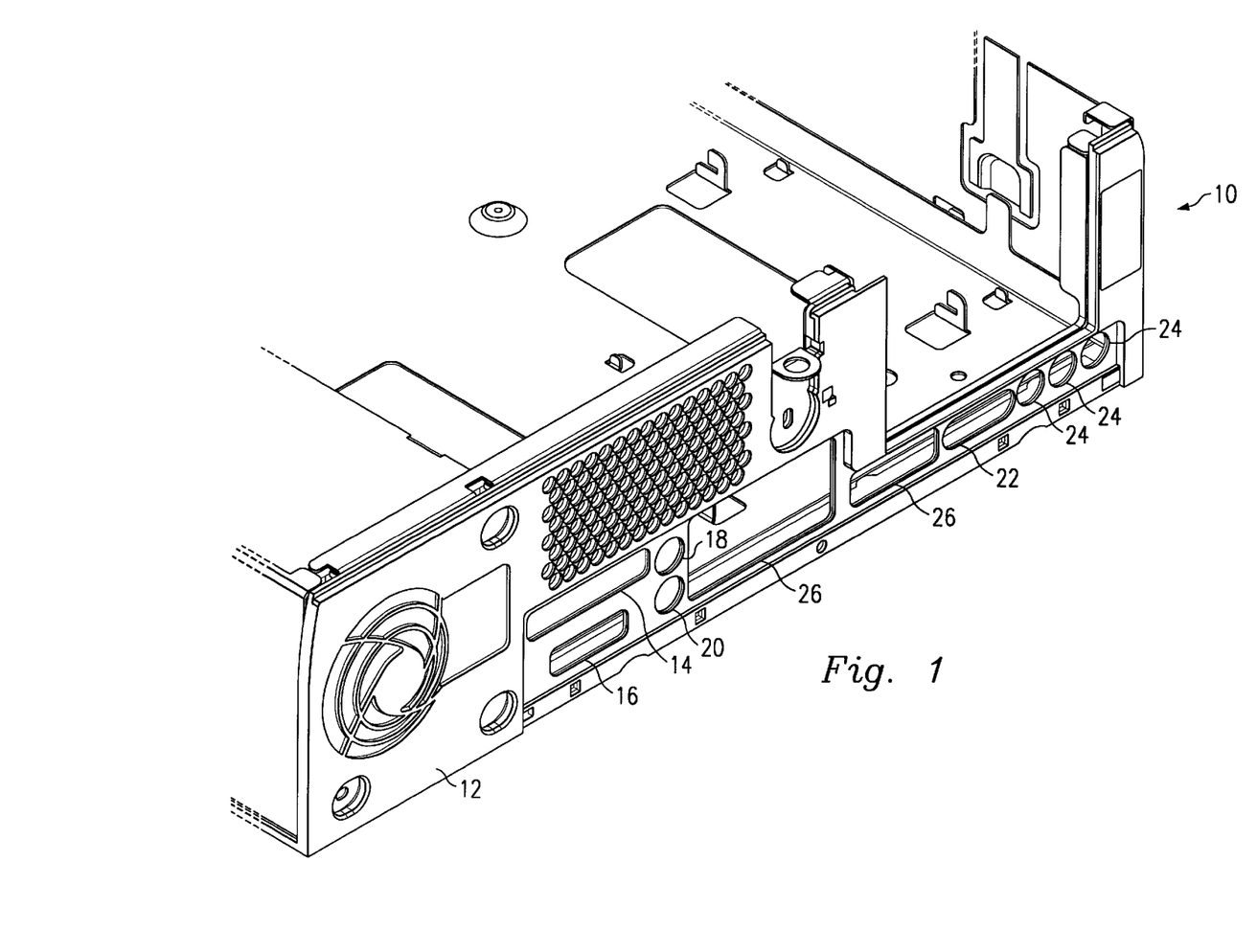
FIG. 1 is a partial cutaway view of the rear of a computer chassis according to one embodiment of the present invention.

FIG. 1 illustrates the rear of a computer chassis 10 manufactured in accordance with a preferred embodiment of the present invention. As shown in FIG. 1, a rear wall 12 of the chassis 10 includes a plurality of dedicated I/O connector cutouts, including a parallel port connector cutout 14, a serial port connector cutout 16, a mouse connector cutout 18, a keyboard connector cutout 20, a VGA connector cutout 22, and audio connector cutouts 24. A flexible I/O area 26, including one or more cutouts for accommodating other connectors that are product or market specific, such as USB and network connectors, is also provided for purposes that will be described in detail below.

Figure 2:
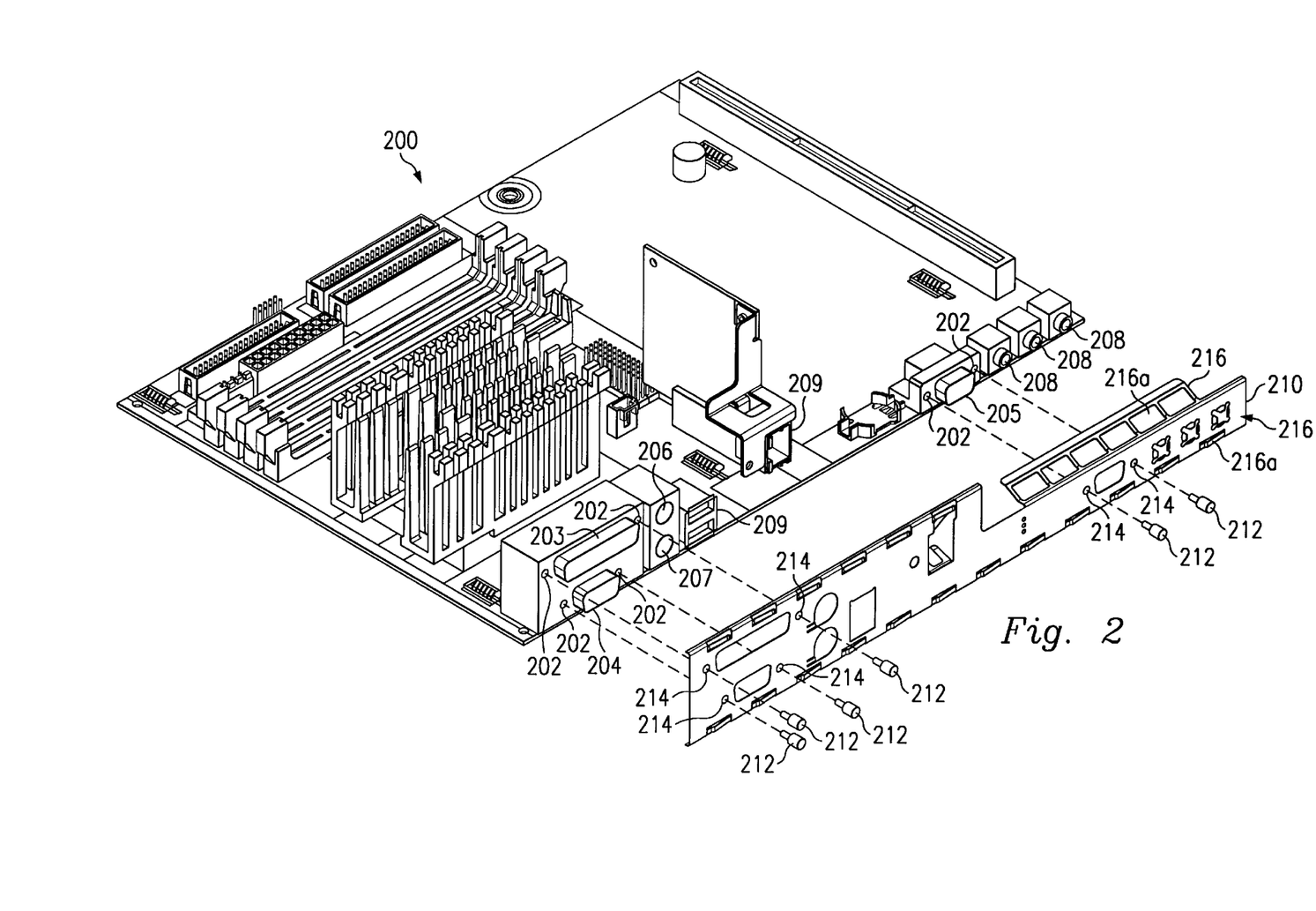
FIG. 2 is a perspective view of a computer system motherboard according to one embodiment of the present invention.

FIG. 2 illustrates a computer system motherboard 200 manufactured in accordance with a preferred embodiment of the present invention. As shown in FIG. 2, the system motherboard 200 includes various "standard" connectors, such as a parallel port connector 203, a serial port connector 204, a VGA connector 205, a mouse connector 206, a keyboard connector 207, and audio connectors 208, as well as additional connectors 209, which may be, for example, a USB connector and a network connector. Threaded bores 202 are provided proximate the parallel, serial, and VGA connectors 203, 204, and 206, for enabling an I/O shield 210 to be attached using jackscrews 212 inserted through holes 214 in the I/O shield 210 and screwed into the bores 202. As shown in FIG. 2, the I/O shield 210 is a thin metal shield having a plurality of cutouts that match the various I/O connectors on the system motherboard 200 such that when the I/O shield 210 is connected to the system motherboard 200, the connectors 203, 204, 205, 206, 207, 208, and 209 extend through the respective cutouts 14, 16, 22, 18, 20 and 24, and the flexible I/O area 26. The I/O shield tooling is designed to be changed easily to remove, add, or change the shape of the various cutouts. In one embodiment, the cutouts 24 can be designed to grip onto the audio connectors 208.

Preferably, the I/O shield 210 is attached to the system motherboard 200 by the motherboard manufacturer; however, it is possible that the I/O shield 210 may be attached to the motherboard 200 by the computer manufacturer or assembler. EMI spring strips 216 including a plurality of EMI spring fingers 216a are provided along the top and bottom edges of the I/O shield 210 for purposes that will be described in greater detail below.

Figure 3:
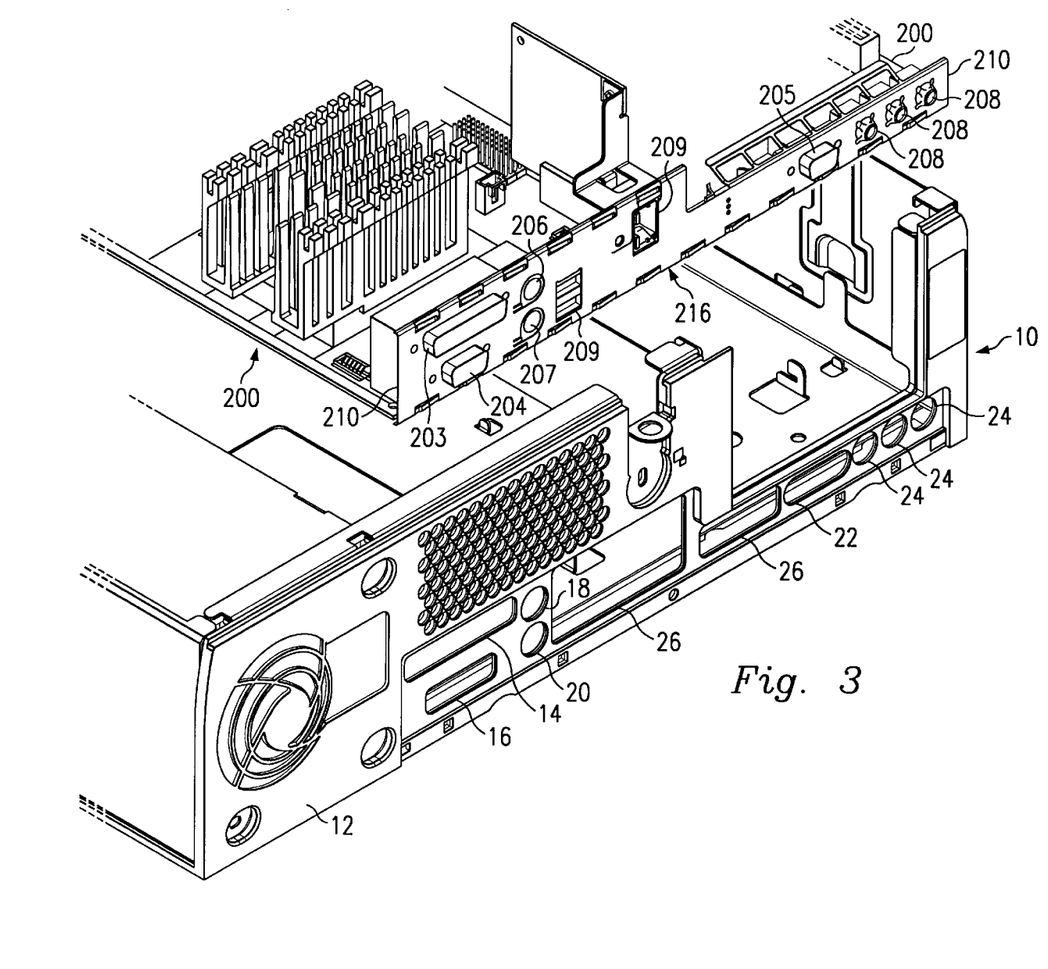
FIG. 3 is a partial cutaway view of the computer system motherboard of FIG. 2 being installed in the computer chassis of FIG. 1.
Figure 4:
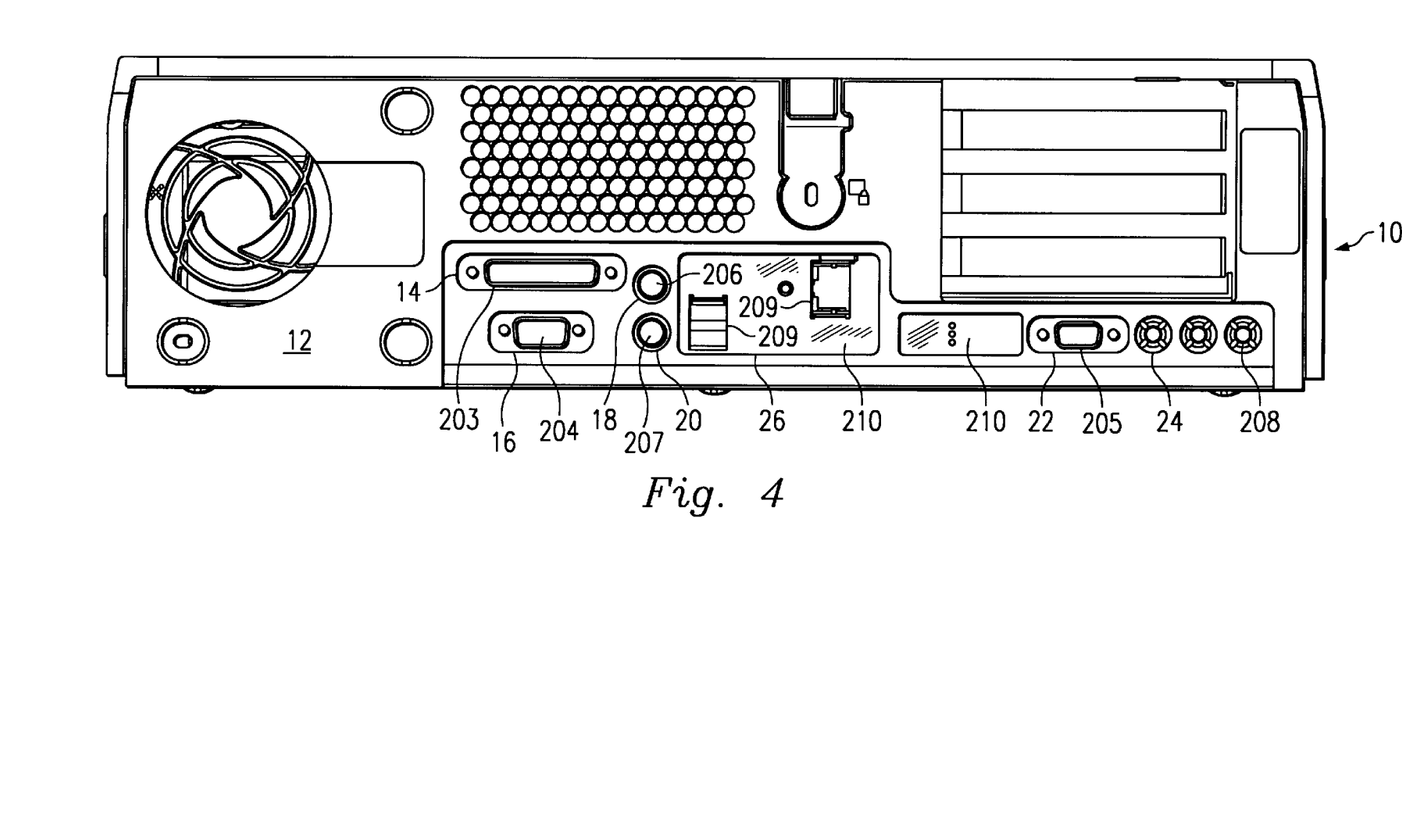
FIG. 4 is a rear plan view of the computer chassis of FIG. 1 after the computer system motherboard of FIG. 2 has been installed therein.

FIG. 3 illustrates installation of the system motherboard 200 and I/O shield 210, assembled as shown in FIG. 2, into the chassis 10 (FIG. 1). FIG. 4 illustrates the rear of the chassis 10 once the assembled system motherboard 200, including the I/O shield 210, has been installed therein as shown in FIG. 3. As shown in FIG. 4, the connectors 203, 204, 205, 206, 207, and 208 extend through the respective cutouts 14, 16, 22, 18, 20, and 24 in the rear wall 12 of the chassis 10 such that they are accessible to a user. Similarly, the additional connectors 209 extend through the flexible I/O area 26. The shield 210 includes an exposed area which is defined by and fills the portions of the flexible I/O area 26 where there is not a connector, and the EMI spring fingers 216a (FIG. 2) are pressed against the inside of the metal enclosure and around the connector shells themselves to provide a tight EMI seal.

Figure 5:
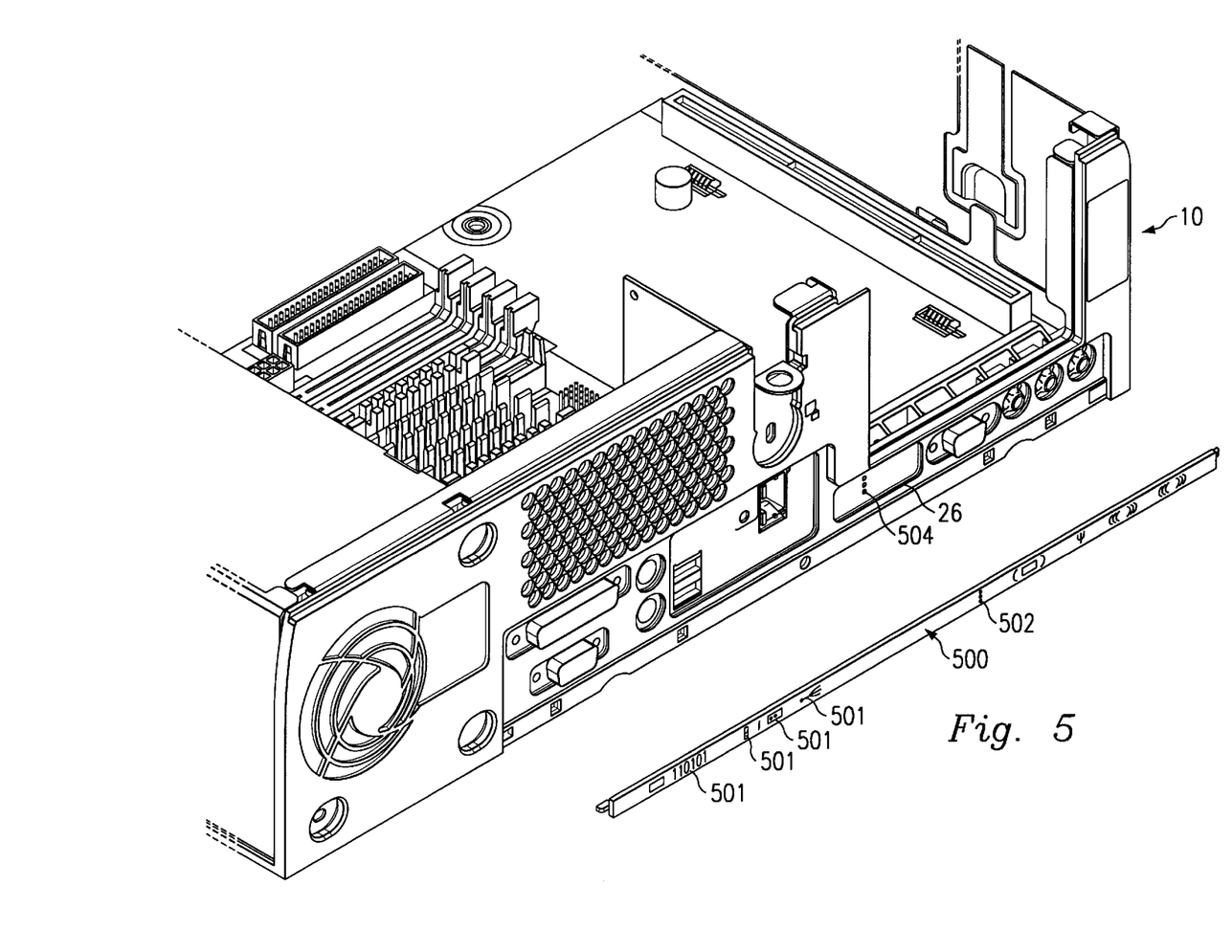
FIGS. 5 and 6 illustrate installation of an I/O label strip according to one embodiment of the present invention.
Figure 6:
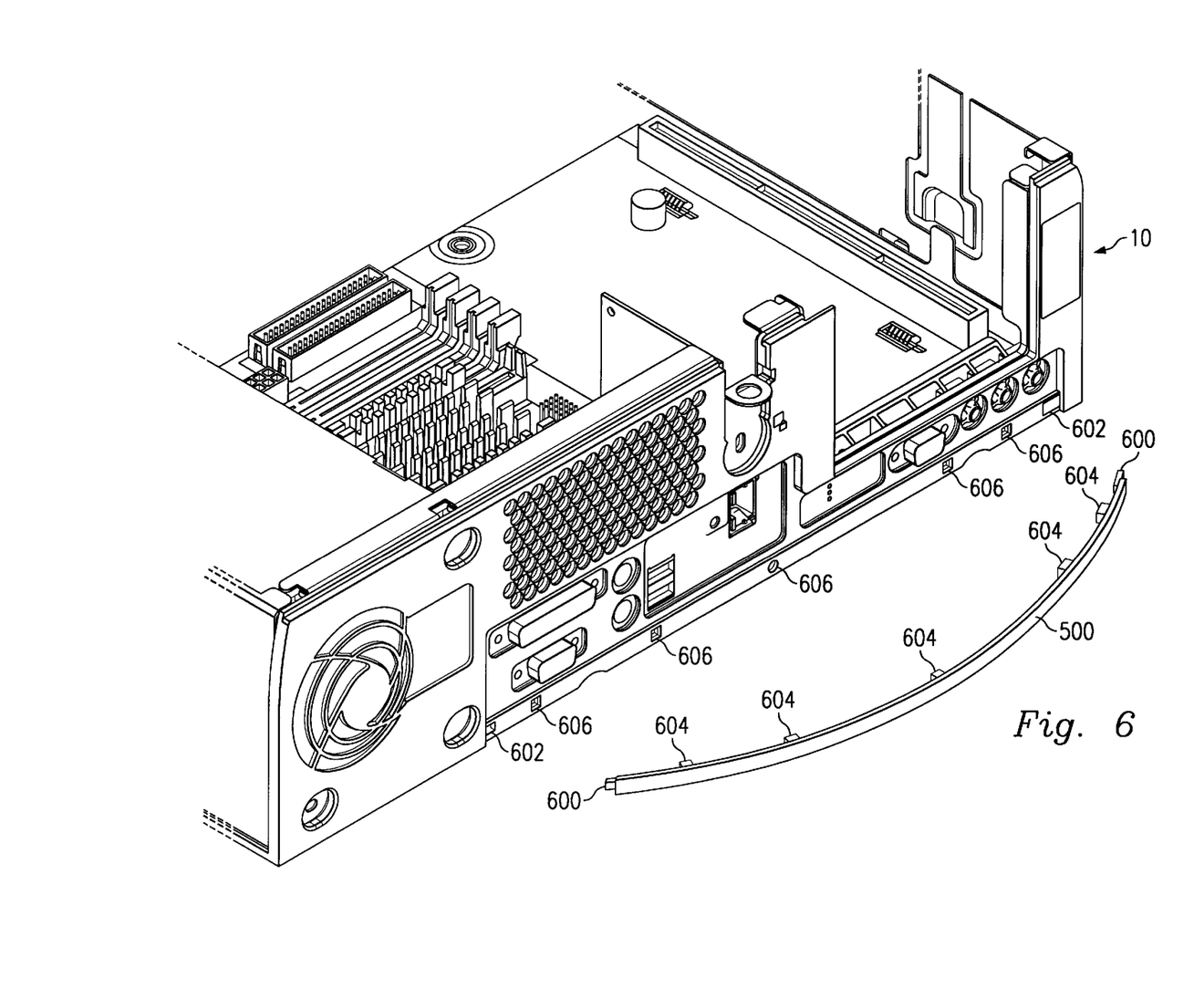

Referring now to FIGS. 5 and 6, in accordance with one embodiment of the present invention, a flexible I/O label strip 500 is provided for identifying the various connectors of a particular computer system. In a preferred embodiment, the strip 500 is a molded strip of plastic having icons printed thereon for identifying respective ones of the connectors provided on the computer system. An alignment code 502, which in the illustrated embodiment includes three dots in a vertical arrangement, is provided on the strip 500 for enabling an assembler apply the correct strip 500 to the chassis 10 by aligning the alignment code 502 with a corresponding alignment code 504 stamped on the I/O shield 210 and displayed through an unused or partially used cutout, such as a cutout 26.

As best shown in FIG. 6, the label strip 500 is secured to the chassis 10 by inserting tabs 600 provided at opposite ends of the strip into slots 602 in the chassis 10. Once the tabs 600 have been inserted in to the slots 602, a plurality of posts 604 are pressed into corresponding holes 606 provided in the chassis 10. Because a press-fit is used to secure the label strip 500 to the chassis 10, if the wrong strip is affixed to a chassis 10, it can easily be removed and replaced with the correct strip.

Figure 7A:
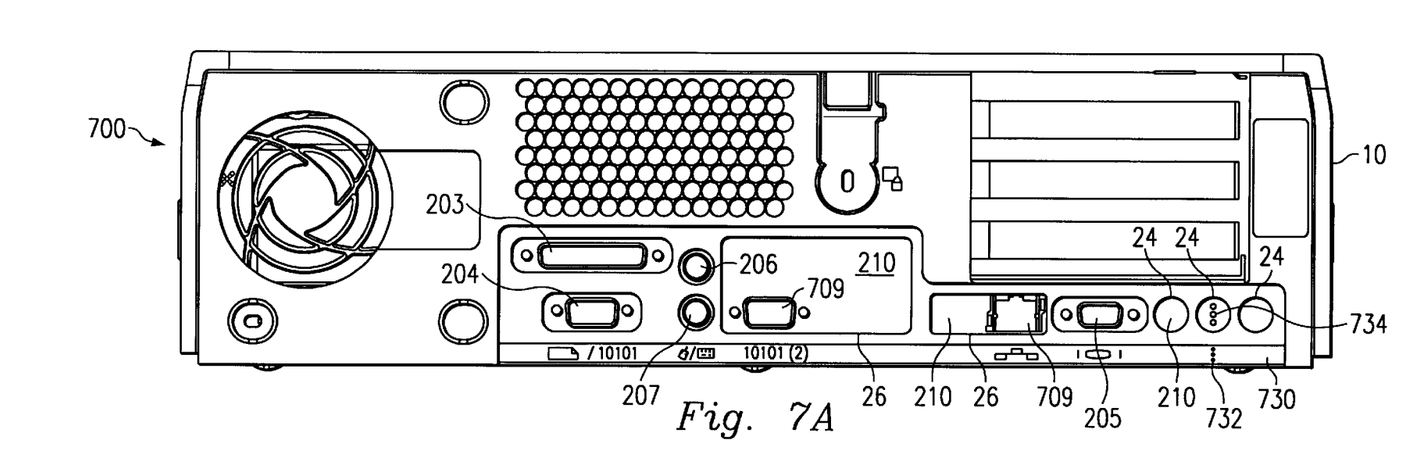
FIGS. 7A and 7B are rear plan views of two different computer systems according to one embodiment of the present invention.
Figure 7B:
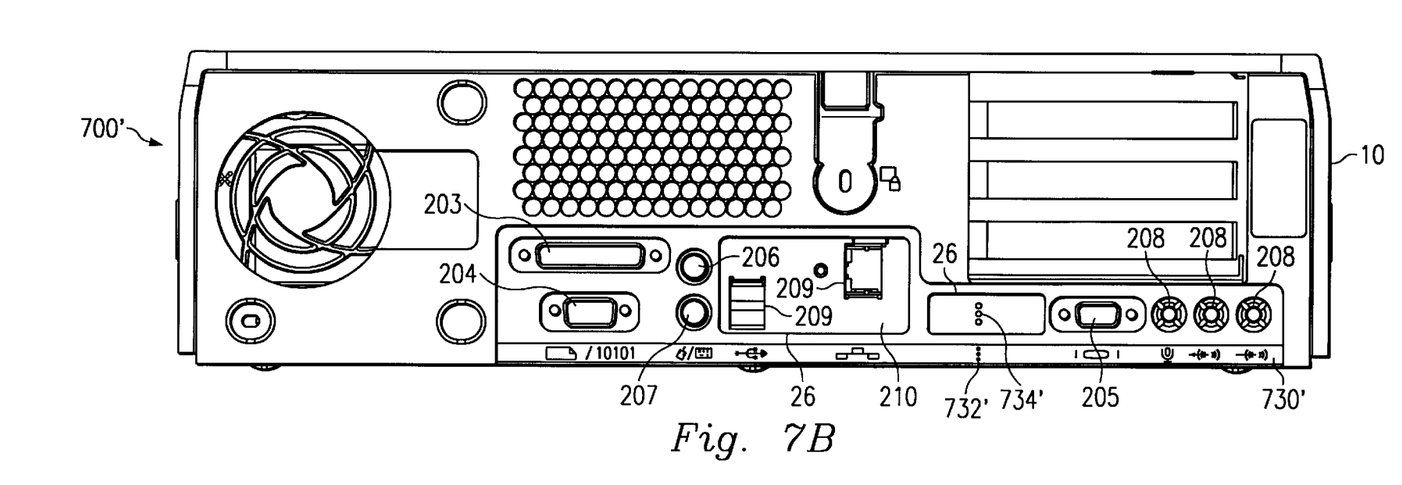

FIGS. 7A and 7B illustrate the rear of two computer systems, system 700 and system 700', respectively, including identical chassis 10, having two different system motherboards installed therein. Referring to FIG. 7A, the system 700 includes a parallel port connector 203, a serial port connector 204, a VGA connector 205, a mouse connector 206, and a keyboard connector 207. The system 700 also includes two additional connectors 709 accessed through a flexible I/O area 26.

It will be recognized that the cutouts that are not completely filled by one or more connectors are filled by the EMI shield 210 (FIG. 2). In particular, because no audio connectors are provided, audio connector cutouts 24 in the chassis of the system 700 are filled with the EMI shield 210. Similarly, the area around the connector 709 within the flexible I/O area 26 is also filled with the EMI shield 210.

Referring now to FIG. 7B, the system 700' includes a parallel port connector 203', a serial port connector 204', a VGA connector 205', a mouse connector 206', a keyboard connector 207', and audio connectors 208', as well as additional connectors 209', both of which are accessible through a flexible I/O area 26'. Again, it will be recognized that the cutouts that are not completely filled by one or more connectors are filled by the EMI shield 210 (FIG. 2). In particular, in the system 700', the space around the connectors 209' in the flexible I/O area 26' is filled by the EMI shield 210. The remainder of the flexible I/O area 26' is filled by the EMI shield 210.

An I/O label strip 730 is affixed to the system 700 and an I/O label strip 730' is affixed to the system 700', as described above with reference to FIGS. 5 and 6. It will be noted that the identity and placement of the icons on the label strips 730, 730' differ in accordance with the identity and placement of the connectors of the systems 700, 700'.

As also described with reference to FIGS. 5 and 6, an alignment code 732 is provided on the I/O label strip 730 which, when aligned with a corresponding alignment code 734 provided on the I/O shield 210 and visible through the center one of the audio connector cutouts 24, ensures that the proper I/O label strip 730 is applied to the system 700. Similarly, an alignment code 732' is provided on the I/O label strip 730' which, when aligned with a corresponding alignment code 734' provided on the I/O shield 210 and visible through the additional flexible I/O area 26, ensures that the proper I/O label strip 730' is applied to the system 700'. It will be recognized if the I/O label strip 730' were to be affixed to the system 700, the code 734' would not be aligned with the code 732, indicating that the incorrect label strip as been affixed to the system. Similarly, if the I/O label strip 730 were to be affixed to the system 700', the code 734' would not be aligned with the code 732, indicating that the wrong label strip is affixed to the system.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A computer system comprising:

a chassis having a standard connector cutout and a flexible I/O cutout in a rear wall thereof;

a motherboard having a standard connector and at least one additional connector, said motherboard being disposed within said chassis such that said standard connector extends through said standard connector cutout and each said at least one additional connector extends through said flexible I/O cutout; and an I/O shield attached to said motherboard at a rear edge thereof such that it is in associative contact with an inner surface of said rear wall, said I/O shield having a first cutout through which said standard connector extends and having an exposed area defined by the flexible I/O cutout and including at least one second cutout through which respective ones of said at least one additional connector extends;

wherein a shape of said standard connector cutout and a shape of said first cutout correspond to a shape of said standard connector, and a shape of each said at least one second cutout corresponds to a shape of said respective at least one additional connector; and wherein a shape of said flexible I/O cutout corresponds to the exposed area of the I/O shield including said at least one additional connector.

2. The computer system of claim 1 further comprising an EMI spring step disposed along at least one edge of said I/0 shield.

3. The computer system of claim 1 wherein said I/0 shield is connected to said motherboard using jack screws.

4. The computer system of claim 1 wherein said at least one other connector is selected from a group consisting of a network connector and a USB connector.

5. The computer system of claim 1 wherein said standard connector is selected from a group consisting of a serial port connector, a parallel port connector, a VGA connector, a mouse connector, a keyboard connector and an audio connector.

6. A computer system comprising:

a chassis having a standard connector cutout and a flexible I/O cutout in a rear wall thereof;

a motherboard having a standard connector and at least one additional connector, said motherboard being disposed within said chassis such that said standard connector extends through said standard connector cutout and each said at least one additional connector extends through said flexible I/O cutout; and an I/O shield attached to said motherboard at a rear edge thereof such that it is in associative contact with an inner surface of said rear wall, said I/O shield having a first cutout through which said standard connector extends and having an exposed area defined by the flexible I/O cutout and including at least one second cutout through which respective ones of said at least one additional connector extends;

a flexible I/O labeling strip having indicia for identifying connectors of said computer system; and means for connecting said flexible I/O labeling strip to an outer surface of said rear wall of said chassis;

wherein a shape of said standard connector cutout and a shape of said first cutout correspond to a shape of said standard connector, and a shape of each said at least one second cutout corresponds to a shape of said respective at least one additional connector; and wherein a shape of said flexible I/O cutout corresponds to the exposed area of the I/O shield including said at least one additional connector.

7. The computer system of claim 6 further comprising an EMI spring strip disposed along at least one edge of said I/O shield.

8. The computer system of claim 6 wherein said means for connecting comprises a plurality of tabs disposed at opposite ends of said flexible I/O labeling strip, said plurality of tabs designed to be inserted into corresponding slots disposed on said rear wall of said chassis.

9. The computer system of claim 8 wherein said means for connecting further comprises posts disposed along said flexible I/O strip on a rear surface thereof, said plurality of posts designed to be press fit into holes disposed on said rear wall of said chassis.

10. The computer system of claim 6 further comprising an alignment code on said flexible I/O strip, said flexible I/O strip designed such that, when it is aligned with a corresponding alignment code disposed on said computer system, said flexible I/O strip is properly aligned with said chassis.

11. The computer system of claim 10 wherein said alignment code of said computer system is stamped onto said I/O shield and visible through a cutout of said chassis.

12. The computer system of claim 6 wherein said I/O shield is connected to said motherboard using jack screws.

* * * * *